Figure 1:
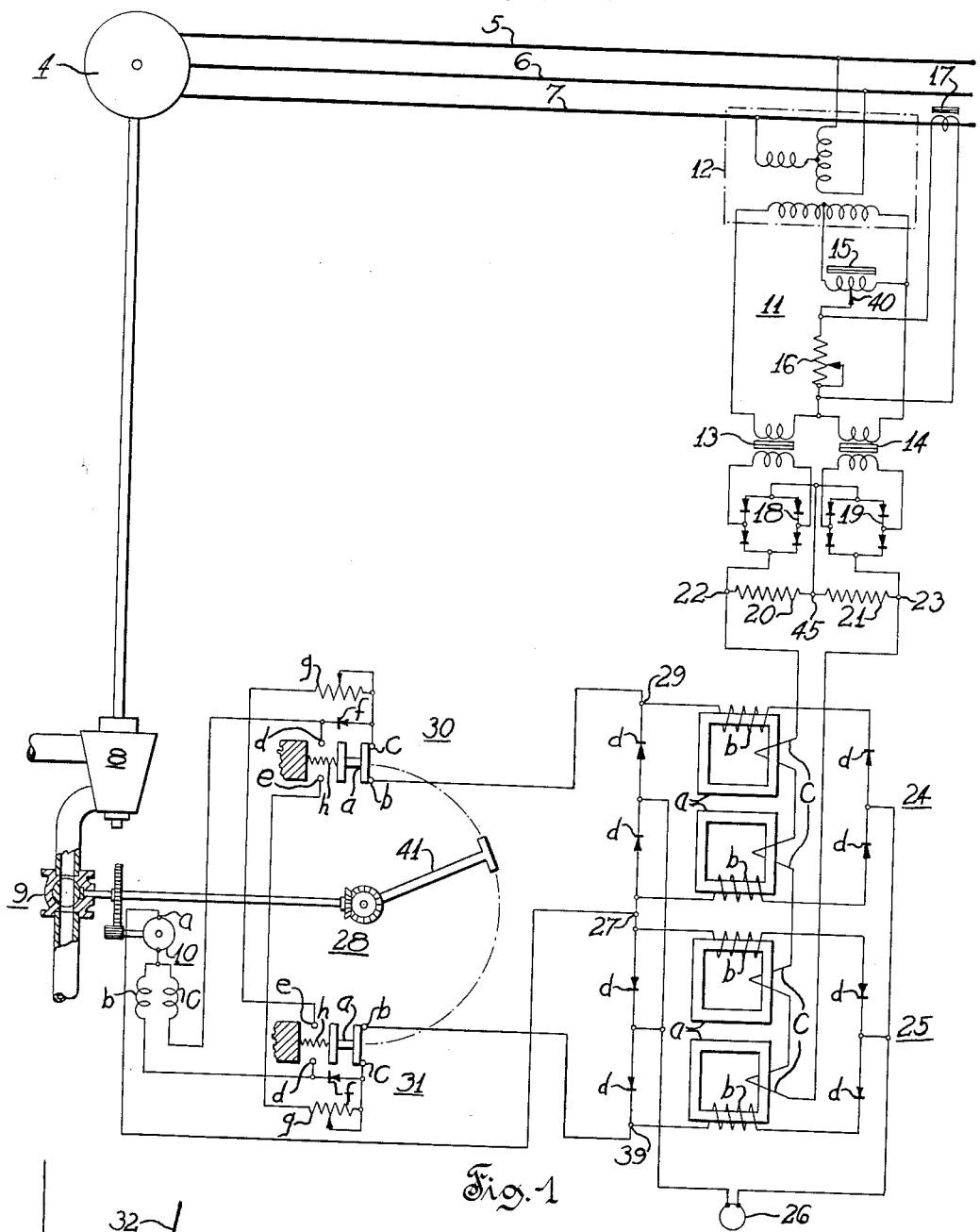

Jan. 31, 1956    A. C. HALTER ET AL    2,733,397
NONLINEAR LIMIT SWITCH CIRCUIT FOR ELECTRIC MOTOR
Filed July 2, 1954

Inventors
Allan C. Halter
Donald E. King
by Howard M. Herriot
Attorney

United States Patent Office 2,733,397
Patented Jan. 31, 1956

2,733,397

NONLINEAR LIMIT SWITCH CIRCUIT FOR ELECTRIC MOTOR

Allan C. Halter, Milwaukee, and Donald E. King, New Berlin, Wis., assignors to Allis-Chalmers Manufacturing Company, Milwaukee, Wis.

Application July 2, 1954, Serial No. 441,126

11 Claims. (Cl. 318—266)

This invention relates in general to electric motor control systems and in particular to a novel limit switch circuit for a reversibly rotatable motor having a pair of field windings excited differentially by a pair of voltage sources operating therewith in push pull arrangement.

In a system having an arrangement of the above type the motor may drive an object which regulates a controlled condition. A pair of oppositely variable voltage sources may be obtained, their difference being indicative of the amount and direction of the variation of the controlled condition from its predetermined desired value. These sources may be applied to differentially excite the fields of the motor to cause the motor to drive the object in such a direction as to equalize the values of the sources to cause the fields of the motor to be equal and opposite and the system to be in balance with the controlled condition at its predetermined value.

In most cases there are certain limiting positions of travel which it is desirable that the driven object not exceed. A physical obstruction may, for example, limit the motion of the driven object, but unless the motor is also stopped, damage may be done, either to the motor or the driven equipment, or both.

It is thus desirable, when the motor reaches its limit positions, to render ineffective any variations of the controlled condition in the direction normally tending to move the motor further in the same direction and to cause the motor to respond only to variations of the controlled condition in the direction tending to produce rotation in the opposite direction and thus away from the limit position.

Motion limiting arrangements are known in which a limit switch simply renders ineffective the means which caused the motor to move to a limit position. Such an arrangement, when used in a system of the type above described, has the disadvantage that, when the limit switch renders one source ineffective, thus deenergizing one field of the motor, the other source causes the other field of the motor to rotate the motor in the reverse direction away from the limit stop position.

It has been discovered that this disadvantage may be overcome by providing means responsive to movement of the motor into a limit position for rendering one source ineffective and for simultaneously causing the other source to supply both field windings of the motor with substantially equal currents so as to prevent the motor from moving until the occurrence of a variation of the controlled condition in the direction opposite to that which caused the motor to be moved to the limit position. It has further been discovered that this may be accomplished by providing a pair of nonlinear voltage dependent resistance elements, a pair of constant resistors, and switching means for causing the sources to normally excite the fields through the nonlinear elements and, in response to the motor reaching a limit position, to disconnect one source from its normally associated field and to cause the other source to excite both fields, its normally associated one through one of the nonlinear elements and the other one through one of the constant resistors.

It is therefore an object of this invention to provide a limit switch arrangement for rendering ineffective any variation of a controlled quantity in the direction tending to move the motor beyond its limit position and to cause the motor to respond only to variations in the controlled quantity in the direction tending to move the motor in the opposite direction, i. e., in the direction away from the limit position.

Another object of this invention is to provide a limit switch arrangement having means for disconnecting one source from its normally associated field and connecting the other source to supply both field windings of the motor with substantially equal currents in response to variations of the controlled quantity in one direction and with substantially different currents in response to variations of the controlled quantity in the opposite direction.

Figure 2:
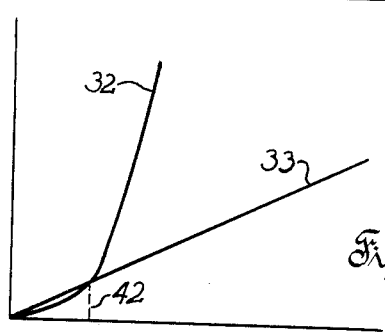

Objects and advantages other than those outlined above will be readily apparent from the following detailed description when read in connection with the accompanying drawing, in which:

Fig. 1 diagrammatically illustrates one embodiment of the invention applied to the regulation and control of the power output of a generator, and Fig. 2 is a graph illustrating the operation of the invention.

In the drawings, where an underlined reference numeral appears in proximity with a plurality of lower case reference letters, the numeral indicates a means comprising a plurality of elements and the elements are indicated by the lower case reference letters. In the specification, these elements are identified by the reference numeral accompanied by the reference letter.

Referring to Fig. 1, an alternating current generator 4 is provided for delivering three phase alternating current power to an output circuit having conductors 5, 6, 7. The output circuit supplies any suitable load devices (not shown) and may be connected to other generators (not shown) so that the output of generator 4 may be regulated at a constant value regardless of the actual power demand of the load devices. The generator is driven by any suitable prime mover, such as a steam turbine 8, the steam supply to which is controlled by a steam valve 9. The steam valve is controlled by a motor 10 which operates to increase the power output of the generator when the motor turns in one direction and to decrease the power output of the generator when it turns in the other direction. The operation of motor 10 is controlled automatically in response to the power output of the generator.

A power responsive system is indicated generally at 11. This comprises a potential transformer 12 whose primary winding is connected across the output circuit of the generator and whose secondary winding is connected to the primary windings of two auxiliary transformers 13 and 14 in series. An adjustable autotransformer 15 has its winding connected across half of the secondary winding of the potential transformer 12. This autotransformer 15 has a sliding contact 40 which is connected to the junction of the primary windings of the auxiliary transformers 13 and 14 through a rheostat 16. Current proportional to the output current of the generator is circulated in the rheostat 16 by means of a current transformer 17 connected in a particular one of the lines of the output circuit of the generator. This is the line whose current at unity power factor is in phase with the voltage of the secondary winding of the potential transformer 12.

The secondary windings of the auxiliary transformers 13 and 14 are connected to the alternating current terminals of rectifiers 18 and 19 respectively. The direct current terminals of rectifiers 18 and 19 are connected to provide signal voltages across resistors 20 and 21 respectively. Resistors 20 and 21 are connected together at terminal 45 and the rectifiers 18 and 19 are so poled that the control voltage across terminals 22, 23 is the difference between the signal voltages across resistors 20, 21.

These signal voltages across resistors 20, 21 are voltage sources which could be applied, in push pull arrangement, directly to motor 10, but to obtain amplified voltage sources for controlling motor 10, the control voltage across terminals 22, 23 is impressed on control elements of amplifiers of any suitable known type such as the series connected control windings 24c, 25c of magnetic amplifiers 24, 25.

Magnetic amplifiers 24, 25, comprise control windings 24c, 25c, reactance windings 24b, 25b, cores 24a, 25a, and rectifiers 24d, 25d connected in full wave rectification arrangement. Reactance windings 24b, 25b are supplied with alternating current from a suitable source such as alternating current generator 26. The amplifiers 24, 25 are connected in a push pull or "back to back" arrangement with field windings 10b, 10c of motor 10. Each of the amplifiers is connected, from their common terminal 27, through the armature 10a of motor 10 to the junction of field windings 10b, 10c. The other side of the field windings are connected, through switching arrangements 30, 31, to the noncommon terminals 29, 39 of the amplifiers, so that amplifier 24 normally supplies field winding 10c and amplifier 25 normally supplies field winding 10b. The field windings are in opposition and act differentially to control the direction of rotation of the motor and thus of steam valve 9 driven thereby.

A motion limit switching device is indicated generally at 28. This comprises switching arrangements 30, 31 and an arm 41 which is driven by motor 10 and which, when rotated to positions corresponding to limit positions of the motor, actuates one or the other of movable contact members 30a, 31a of switching arrangements 30, 31. Movable contact member 30a controls a pair of normally closed stationary contacts 30b, 30c, and a pair of normally open stationary contacts 30d, 30e. Movable contact member 31a controls a pair of normally closed stationary contacts 31b, 31c and a pair of normally open stationary contacts 31d, 31e. Contact 30b is connected to terminal 29 of amplifier 24. A nonlinear voltage dependent resistance element such as a selenium rectifier 30f is connected between contact 30c and field winding 10c. Contact 31b is connected to terminal 39 of amplifier 25. Another nonlinear voltage dependent resistance element such as selenium rectifier 31f is connected between contact 31c and field winding 10b. A linear or constant resistor 30g is connected between contact 30c and contact 31e. Another constant resistor 31g is connected between contact 31c and contact 30e. Resistors 30g, 31g are adjustable so that their resistance values may be easily selected as desired.

Referring to Fig. 1, the operation of the system is as follows: The predetermined desired amount of power which the generator 4 is to deliver to the system is determined by the setting of the slider 40 on the variable voltage auto-transformer 15. The secondary voltage of this transformer must be balanced by the voltage drop in the potentiometer rheostat 16 in order for the voltages of the auxiliary transformers 13 and 14 to be equal. Only under these conditions will the control voltage across terminals 22, 23, be zero and thus the outputs of the two amplifiers 24, 25 be equal, to equally and oppositely excite field windings 10b, 10c to hold the motor 10 at rest and the system in balance with the power at the predetermined desired value.

The primary winding of the auxiliary transformer 14 is energized by the vector resultant of the voltage drop in the rheostat 16 and the voltage of the right hand part of the variable voltage transformer 15. The primary winding of the auxiliary transformer 13 is energized by the vector resultant of the voltage drop in the rheostat 16, the voltage of the left hand half of the secondary winding of the potential transformer 12 and the voltage of the left hand part of the variable voltage transformer 15. In order for the power responsive system to balance, therefore, the voltage drop in the rheostat has to be equal in magnitude and opposite in phase to the voltage of the part of variable voltage transformer 15 to the left of the slider 40. By reason of the connections of the potential transformer 12 and the current transformer 17, this balance is obtained by the in-phase component of the generator current. Consequently, the quadrature component affects the energization of both auxiliary transformers 13 and 14 equally and therefore has no effect on the balanced condition of the system.

Assuming next that the power output of the generator changes, an unbalance between the energizations of the auxiliary transformers 13 and 14 occurs and this unbalance varies in opposite directions depending upon whether the power output of the generator has increased or decreased from the predetermined desired value determined by the setting of slider 40. Consequently, the reversible unidirectional control voltage appearing across terminals 22, 23 is an indication of the magnitude and direction of the deviation of the power output of the generator from its predetermined desired value.

Control windings 24c, 25c are wound on cores 24a, 25a so that a control voltage thereacross in one direction causes the output of amplifier 24 to increase and the output of amplifier 25 to decrease and so that a control voltage in the opposite direction causes the output of amplifier 25 to increase and the output of amplifier 24 to decrease.

Assume that the power output of the generator decreases from its predetermined desired value, causing a control voltage of the direction to increase the output of amplifier 24 and to decrease the output of amplifier 25. Amplifier 24 thus supplies field winding 10c with an increased current through a circuit including terminal 29, contacts 30b, 30c, rectifier 30f, field winding 10c, motor armature 10a and terminal 27 while amplifier 25 supplies field winding 10b with a decreased current through a circuit including terminal 39, contacts 31b, 31c, rectifier 31f, field winding 10b, motor armature 10a and terminal 27. Field winding 10c thus overcomes field winding 10b and the motor rotates in the direction to turn steam valve 9 so as to admit more steam to the turbine. The power output of the generator is thus increased and this action continues until the power output is returned to the predetermined desired value, whereupon the signal voltages across resistors 20, 21 become equal so that the control voltage across terminals 22, 23 becomes zero. The outputs of amplifiers 24, 25 are thus equal and the motor field windings are therefore equally and oppositely excited by amplifiers 24, 25 and the motor is therefore at rest with the power at the predetermined desired value.

If the power output has not been returned to the desired value when the steam valve reaches the limit of its travel, the motor must be stopped to prevent damage to the motor and the equipment driven thereby. To accomplish this, the motion limit switching device 28 has been provided. As the motor rotates to drive the steam valve, it also drives arm 41 of the motion limit switching device. Arm 41, when driven to one or the other positions corresponding to the respective limit positions of the valve, and thus of the motor acts against one or the other of springs 30h, 31h, to actuate one or the other of movable contact members 30a, 31a.

Assume, for example, that during the power decrease deviation described above, the steam valve is driven to its open limit position before the power output is returned to the desired value. The arm 41 is thus also driven to its corresponding limit position to actuate movable contact member 30a to open contacts 30b, 30c and to close contacts 30d, 30e.

The opening of contacts 30b, 30c disconnects field winding 10c from its source by disconnecting the output circuit of amplifier 24 from field winding 10c to render amplifier 24 ineffective. The simultaneous closing of contacts 30d, 30e connects field winding 10c to the source suppling field winding 10b by connecting the output circuit of amplifier 25 to field winding 10c through a circuit including terminal 39, closed contacts 31b, 31c, constant resistor 31g, contacts 30d, 30e, which are then closed, field winding 10c, motor armature 10a, and terminal 27. Amplifier 25 then supplies both field windings 10b, 10c; field winding 10b through rectifier 31f and field winding 10c through constant resistor 31g.

The nonlinear resistance elements and the constant resistors are chosen so that their resistances are materially different for voltages above a certain value but are substantially equal for voltages below this value. Fig. 2 illustrates the effect of this arrangement. In Fig. 2, the abscissa represents the voltage output of amplifier 25 and the ordinate represents current. Line 32 represents the current through rectifier 31f and thus through field winding 10b. Line 33 represents the current through constant resistor 31g and thus through field winding 10c. The voltage output of amplifier 25 at zero control voltage across terminals 22, 23 when the system is in balance is represented by 42. The system is so adjusted that this balance is reached when the output of generator 4 has the desired value. When the power decrease deviation occurred as described above, amplifier 25 decreased its output to a value less than the value 42. Thus, as is illustrated in Fig. 2, when contact member 30a operates, the current through the rectifier 31f and through field winding 10b is substantially equal to the current through the constant resistor 31g and through field winding 10c so that the differential effect of field windings 10b, 10c is not great enough to rotate motor 10. The motor is thus held at rest and prevented from moving beyond its limit position as long as the power decrease deviation continues.

The motor is held at rest until the control voltage reverses, i. e., until the power returns to and deviates above the predetermined value to cause the output of amplifier 25 to increase above the value 42. When the power returns to and increases above its predetermined value, the control voltage across terminals 22, 23 returns to zero and then reverses, causing the output voltage of amplifier 25 to increase above the balanced condition value 42. Amplifier 25 then, as is illustrated in Fig. 2, supplies field winding 10b through rectifier 31f with much more current than it supplies to field winding 10c through constant resistor 31g, and the motor is thus caused to rotate in the direction to bring the steam valve 9 and arm 41 back off the limit position into the range of travel for normal operation. As arm 41 returns back into the normal range of operation, spring 30h causes movable contact member 30a to close contacts 30b, 30c and open contacts 30d, 30e. The system then is again set for normal operation.

For an increase in power above the predetermined desired value, the operation is similar to that described above for decreases in power, and the limit stop operation for a continued power increase deviation is also similar to that described above for a continued power decrease deviation but involves switching arrangement 31 instead of switching arrangement 30.

Thus when the motor reaches a limit position, any deviation of the controlled condition from its predetermined value in the direction normally tending to move the motor and steam valve beyond the limit position is rendered ineffective, and the motor is caused to respond only to a deviation of the controlled condition from its predetermined value in the direction tending to move the motor in the opposite direction, i. e., away from the limit position and back into the normal range of travel. The motor is thus stopped and prevented from moving, except in the direction away from its limit position.

Features disclosed but not claimed herein are claimed in application of Thomas H. Bloodworth, Serial Number 441,515, filed July 6, 1954.

Although only one embodiment of the invention has been illustrated and described, it will be apparent to those skilled in the art that various changes and modifications may be made therein without departing from the spirit of the invention or from the scope of the appended claims.

It is claimed and desired to secure by Letters Patent:

1. In combination, a motor having first and second field windings, first and second oppositely variable voltage sources for energizing said field windings, circuits for connecting said first and second field windings to said first and second sources respectively for driving said motor in one direction when the voltage of said first source is above a predetermined value and the voltage of said second source is below said value and in the opposite direction when the voltage of said second source is above said value and the voltage of said first source is below said value, switching means responsive to said motor being moved in said one direction to a limit position to disconnect said first field winding from said first source and to connect said first field winding to said second source causing the energization of said field windings from said second source to be substantially balanced to stop said motor, and means in the connections between said second source and said field windings responsive to the voltage of said second source rising above said value for materially unbalancing the energization of said field windings from said second source to rotate said motor in said opposite direction tor causing said switching means to disconnect said first field winding from said second source and to connect said first field to said first source.

2. In combination, a motor having a pair of field windings, a pair of oppositely variable voltage sources connected therewith in push pull arrangement for oppositely exciting said windings, a pair of nonlinear voltage dependent resistance elements, a constant resistor, and switching means normally connecting said sources to said field windings through said pair of elements and responsive to movement of said motor into a limit position for disconnecting one of said field windings from one of said sources and connecting the other of said sources to said one of said field windings through said resistor to thereby substantially balance the energization of said field windings to stop the motor.

3. In combination, a motor having first and second differentially acting field windings, first and second nonlinear voltage dependent resistance elements, first and second oppositely variable voltage sources connected in push pull arrangement to said field windings through said first and second elements respectively for driving said motor in one direction when the voltage of said first source is above a predetermined value and the voltage of said second source is below said value and in the opposite direction when the voltage of said second source is above said value and the voltage of said first source is below said value, a constant resistor, and switching means responsive to movement of said motor into a limit position for disconnecting said first field winding from said first source and for connecting said first field winding in series with said resistor and said second source to cause the energization of said field windings to be substantially balanced to stop said motor and to cause the energization of said field windings, in response to the voltage of said second source rising above said value, to become materially unbalanced to rotate said motor in said opposite direction to cause said switching means to disconnect said first field winding from said second source and to connect said first field winding to said first source.

4. In combination, a motor having first and second field windings, a first selenium rectifier, a first voltage source connected in series with said first field winding and said first rectifier, a second selenium rectifier, a second voltage source connected in series with said second winding and said second rectifier, said first and second sources being oppositely variable and operating in push pull arrangement to oppositely excite said first and second field windings for driving said motor in one direction when the voltage of said first source is above a predetermined value and the voltage of said second source is below said value and in the opposite direction when the voltage of said second source is above said value and the voltage of said first source is below said value, a constant resistor, and switching means responsive to movement of said motor into a limit position of said motor for disconnecting said first field winding from said first source and for connecting said first field winding in series with said constant resistor and said second source to cause the energization of said field windings to be substantially balanced to stop said motor and to cause the energization of said field windings, in response to the voltage of said second source rising above said value, to become materially unbalanced to rotate said motor in said opposite direction to cause said switching means to disconnect said first field winding from said second source and to connect said first field winding to said first source.

5. In combination, a motor having first and second field windings, first and second oppositely variable voltage sources connected to said field windings in push pull arrangement for oppositely exciting said field windings to reversibly rotate said motor, first and second nonlinear voltage dependent resistance elements, first and second constant resistors, and switching means for normally connecting said first element in series with said first field winding and said first source and connecting said second element in series with said second field winding and said second source, said switching means being responsive to movement of said motor into a first limit position for disconnecting said first field winding from said first source and connecting said first field winding in series with said second constant resistor and said second source, and said switching means being responsive to movement of said motor into a second limit position for disconnecting said second field winding from said second source and connecting said second field winding and said first constant resistance in series with said first source.

6. In combination, a motor having first and second field windings, first and second oppositely variable voltage sources connected to said field windings in push pull arrangement for oppositely exciting said field windings to reversibly rotate said motor, first and second selenium rectifiers, first and second constant resistors, and switching means comprising a first set of normally closed contacts for connecting said first rectifier and said first field winding in series with said first source, a second set of normally closed contacts for connecting said second rectifier and said second field winding in series with said second source, a first set of normally open contacts for connecting said second resistor and said first field winding in series with said second source, and a second set of normally open contacts for connecting said first resistor and said second field winding in series with said first source, said switching means being responsive to movement of said motor into a first limit position for opening said first set of normally closed contacts and closing said first set of normally open contacts and responsive to movement of said motor into a second limit position for opening said second set of normally closed contacts and closing said second set of normally open contacts.

7. In combination, a motor having first and second field windings, first and second amplifiers connected to said field windings in push pull arrangement for oppositely exciting said field windings, means for impressing a unidirectional reversible control voltage on said amplifiers for reversibly rotating said motor, first and second selenium rectifiers, first and second constant resistors, and switching means comprising a first set of normally closed contacts for connecting said first rectifier and said first field winding in series with the output circuit of said first amplifier, a second set of normally closed contacts for connecting said second rectifier and said second field winding in series with the output circuit of said second amplifier, a first set of normally open contacts for connecting said second resistor and said first field winding in series with the output circuit of said second amplifier, and a second set of normally open contacts for connecting said first resistor and said second field winding in series with the output circuit of said first amplifier, said switching means being responsive to movement of said motor into a first limit position for opening said first set of normally closed contacts and closing said first set of normally open contacts and responsive to movement of said motor into a second limit position for opening said second set of normally closed contacts and closing said second set of normally open contacts.

8. In combination, a motor having first and second field windings, first and second amplifiers connected to said field windings in push pull arrangement for oppositely exciting said field windings, means for impressing a unidirectional reversible control voltage on said amplifiers for reversibly rotating said motor, first and second nonlinear voltage dependent resistance elements, first and second constant resistors, and switching means for normally connecting said first element in series with said first field winding and the output circuit of said first amplifier and connecting said second element in series with said second field winding and the output circuit of said second amplifier, said switching means being responsive to movement of said motor into a first limit position for opening the output circuit of said first amplifier and connecting said second constant resistor in series with said first field winding and the output circuit of said second amplifier, and said switching means being responsive to movement of said motor into a second limit position for opening the output circuit of said second amplifier and connecting said first constant resistor in series with said second field winding and the output circuit of said first amplifier.

9. In combination, a motor having first and second field windings, a first nonlinear voltage dependent resistance element, a first amplifier having its output circuit connected in series with said first field winding and said first element, a second nonlinear voltage dependent resistance element, a second amplifier having its output circuit connected in series with said second winding and said second element, said first and second amplifiers operating in push pull arrangement to oppositely excite said first and second field windings, a constant resistor, and switching means responsive to movement of said motor into a limit position for opening the output circuit of said first amplifier and for connecting said first field winding in series with said constant resistor and the output circuit of said second amplifier.

10. In combination, a motor having first and second differentially acting field windings, first and second selenium rectifiers, first and second amplifiers connected in push pull arrangement to said field windings through in push pull arrangement to said field windings through said first and second rectifiers respectively for reversibly rotating said motor, a constant resistor, and switching means responsive to movement of said motor into a limit position for disconnecting said first field winding from said first amplifier and for connecting said first field winding in series with said resistor and said second amplifier.

11. In combination, a motor having a pair of field windings, a pair of amplifiers connected therewith in push pull arrangement for oppositely exciting said windings, a pair of nonlinear voltage dependent resistance elements, a constant resistor, and switching means normally connecting said amplifiers to said field windings through said pair of elements and responsive to movement of said motor into a limit position for disconnecting one of said amplifiers from one of said field windings and connecting the other of said amplifiers to said one of said field windings through said resistor to thereby stop the motor.

No references cited.